United States Patent [19]

Zimmerman et al.

[11] 4,338,408
[45] Jul. 6, 1982

[54] POLYURETHANES USING BIS(AMINOETHYL)ETHER DERIVATIVES AS CATALYSTS

[75] Inventors: Robert L. Zimmerman, Austin; Ernest L. Yeakey, Houston, both of Tex.

[73] Assignee: Texaco Inc., White Plains, N.Y.

[21] Appl. No.: 284,900

[22] Filed: Jul. 20, 1981

[51] Int. Cl.$^3$ .................. C08G 18/18; C08G 18/14
[52] U.S. Cl. ........................... 521/115; 521/137; 521/167; 528/49; 528/75; 564/471; 564/475; 564/508
[58] Field of Search .............. 521/115, 137, 167; 528/49, 75; 564/471, 475, 508

[56] References Cited

U.S. PATENT DOCUMENTS

| | | | |
|---|---|---|---|
| 3,152,998 | 10/1964 | Moss | 544/358 |
| 3,330,782 | 7/1967 | Poppelsdorf | 260/2.5 |
| 3,420,828 | 1/1969 | Muhlbauer | 260/247.7 |
| 3,694,510 | 9/1972 | Moller et al. | 521/115 |
| 4,026,840 | 5/1977 | Bechara et al. | 260/2.5 AC |
| 4,101,470 | 7/1978 | McEntire | 521/118 |
| 4,148,980 | 4/1979 | Narayan | 521/115 |
| 4,289,858 | 9/1981 | Koehler et al. | 521/167 |

Primary Examiner—H. S. Cockeram
Attorney, Agent, or Firm—Carl G. Ries; Jack H. Park; David L. Mossman

[57] ABSTRACT

The alkylene oxide adduct of bis(aminoethyl)ether may be reacted with formaldehyde in the presence of hydrogen and a hydrogenation-dehydration catalyst to produce new compounds of the formula

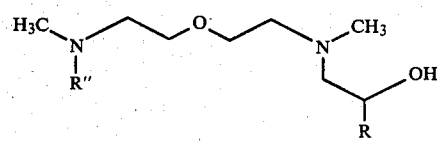

where R is hydrogen or lower alkyl and R" is methyl or

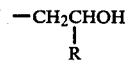

These compounds show unexpectedly high efficiency as polyurethane catalysts. Fewer equivalents of this amine are required to produce foams having the same reaction profile as foams made with prior art amine catalysts.

11 Claims, No Drawings

POLYURETHANES USING BIS(AMINOETHYL)ETHER DERIVATIVES AS CATALYSTS

A related application, Ser. No. 284,427, directed to the bis(aminoethyl)ether derivatives as novel compounds has been filed of even date.

BACKGROUND OF THE INVENTION

1. Field of the Invention

The invention relates to polyurethanes and the production thereof and more particularly relates to polyurethanes using amine catalysts which contain ether and hydroxyl moieties.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain extending isocyanate-hydroxyl reaction by which a hydroxyl-containing molecule is reacted with an isocyanate-containing molecule to form a urethane. This increases the viscosity of the mixture and provides a polyurethane containing a secondary nitrogen atom in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. The third reaction is not essential if an extraneous blowing agent, such as a halogenated, normally liquid hydrocarbon, carbon dioxide, etc. is employed, but is essential if all or even a part of the gas for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines, such as trimethylamine, triethylamine, etc., are effective for catalyzing the second crosslinking reaction. Other typical tertiary amines are set forth in U.S. Pat. Nos. 3,925,368; 3,127,436; and 3,243,387 and German OLS Nos. 2,354,952 and 2,259,980. Some of the tertiary amines are effective for catalyzing the third water-isocyanate reaction for carbon dioxide evolution. However, tertiary amines are only partially effective as catalysts for the first chain extension reaction. To overcome this problem, the so-called "prepolymer" technique has been developed wherein a hydroxycontaining polyol component is partially reacted with the isocyanate component in order to obtain a liquid prepolymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction and the tin compound is particularly active in synergistic combination with the triethylenediamine for promoting the chain extension reaction. However, even here, the results obtained leave much to be desired. Triethylenediamine is a solid and must be dissolved prior to use to avoid processing difficulties. Also, triethylenediamine and other of the prior art amines can impart a strong amine odor to the polyurethane foam.

In addition to problems of odor and handling due to solid character, other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the preform mix in the mold. Yet other catalysts, while meeting specifications in this area do not yield foams with a desirable tack-free time.

Lastly, while certain tertiary amines are somewhat suitable in this catalytic area they nevertheless do not have a sufficiently high tertiary amine content in terms of the number of tertiary amines compared to overall molecular weight. It is believed that the higher the tertiary amine content the more rapid the catalytic activity in the polyurethane art.

It would be an advance in the art if a new class of amine catalysts were discovered which would overcome some of the aforementioned disadvantages of the prior art. It would also be advantageous if an unused by-product stream from an existing process could be adapted to provide the new amine catalysts. In the production of morpholine and 2-(2-aminoethoxy)ethanol from ammonia and diethylene glycol, a by-product stream that contains methoxyethylmorpholine and bis-(aminoethyl)ether is produced. This by-product stream may be purified by adding ethylene oxide to react with the bis(aminoethyl)ether and then distilling off the useful methoxyethylmorpholine according to the teaching of U.S. Pat. No. 3,420,828. However, no use has been made of the ethylene oxide adduct of bis(aminoethyl)ether until the invention of the novel tertiary amine ether urethane catalysts herein.

Other tertiary amine ethers useful as catalysts for isocyanate reactions are the beta-(N,N-dimethylamino)alkyl ethers described in U.S. Pat. No. 3,330,782. Other tertiary amines which also have hydroxyl substituents are the hydroxyalkyl tertiary amines of U.S. Pat. Nos. 4,026,840 and 4,101,470.

SUMMARY OF THE INVENTION

The invention is a method for producing a polyurethane which comprises reacting an organic polyisocyanate with an organic polyester polyol or polyether polyol in the presence of a catalytic amount of an amine of the formula

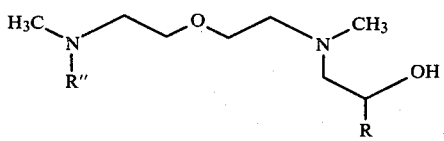

where R is hydrogen or lower alkyl and R" is methyl or

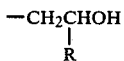

DESCRIPTION OF THE PREFERRED EMBODIMENTS

Generally, the reaction to produce the catalyst of this invention proceeds as follows. Bis(aminoethyl)ether of the formula $H_2NCH_2CH_2OCH_2CH_2NH_2$ is reacted with an alkylene oxide of the formula

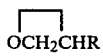

in accordance with the method of U.S. Pat. No. 3,420,828, incorporated by reference herein, wherein R is hydrogen or lower alkyl to produce a compound of the formula

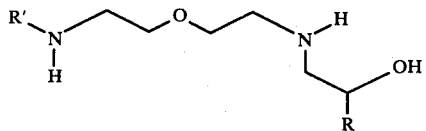

where R' is hydrogen or

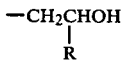

By the method of this invention, compound II is reacted with formaldehyde in the presence of hydrogen and a hydrogenation-dehydrogenation catalyst to make compound I.

The reactions to make the polyurethane catalyst should be conducted at an elevated temperature. The alkoxylation step is preferably conducted in the temperature range from about 50° to 150° C., while the hydrogenation is preferably carried out in the temperature range from about 75° to 250° C. The hydrogen pressure in the second step is preferably from about atmospheric to 3,000 psig and is especially preferred to be on the order of about 1000 psig. The catalyst may be any hydrogenation-dehydrogenation catalyst, though it is preferred that the catalyst contain nickel, copper and chromium oxide or cobalt, copper and chromium oxide, and it is especially preferred that the catalyst be prepared according to the method described in U.S. Pat. No. 3,152,998 assigned to Texaco Chemical Co., incorporated by reference herein.

The starting materials are limited to bis(aminoethyl)ether and alkylene oxides. The alkylene oxides are preferably ethylene oxide, propylene oxide and butylene oxide, although higher oxides may be used. The formaldehyde reactant of the second step may be employed in another form, such as paraformaldehyde. The preparation of the unique compounds of this invention is further illustrated by the following two examples.

EXAMPLE I

PREPARATION OF 2-[N-(DIMETHYLAMINOETHOXYETHYL)-N-METHYLAMINO]ETHANOL

A 1500 ml kettle was charged with 900 grams of a mixture of methoxyethylmorpholine, bis(aminoethyl)ether, aminoethylmorpholine and water in the weight proportions 19:67:5:6. The mixture was heated to 80° C. and 229.7 grams of ethylene oxide was added. The reaction was then digested at 90° C. for 1½ hours. The material was then put through a wiped film evaporator at 90° C. and 0.4 mm Hg vacuum. There was obtained 876.7 grams of bottoms material. Five hundred grams of this material was added to a flask which contained 334.5 grams of paraformaldehyde and 1500 ml of isopropanol. This mixture was then transferred to an autoclave and reduced using a nickel, copper, chromium oxide catalyst at 110° C. and 1000 psig of hydrogen. Following the hydrogenation, the reaction mixture was filtered then fractionally distilled. The resulting 2-[N-(dimethylaminoethoxyethyl)-N-methylamino]ethanol had a boiling point of 110°–115° C. at 0.5 mm Hg.

EXAMPLE II

PREPARATION OF 2-[N-DIMETHYLAMINOETHOXYETHYL)-N-METHYLAMINO]-1-METHYLETHANOL

A 1500 ml kettle was charged with 900 grams of the mixture of bis(aminoethyl)ether and N-methoxyethylmorpholine in the same proportions as in Example I. The mixture was heated to 80° C. and then 151.4 grams of propylene oxide was added. After digesting at 90° C. for 1½ hours the reaction mixture was discharged into a 2 liter flask. The unreacted portion was then removed under vacuum leaving 386.6 grams of material. Three hundred grams of this material were reductively alkylated using 162.3 grams of paraformaldehyde and a nickel, copper, chromium oxide catalyst at 1000 psig of hydrogen and 110° C. The product was purified using a wiped film evaporator at 120° C. and 0.25 mm Hg vacuum. The overhead fraction contained mainly the 1-propylene oxide adduct with a little 2-propylene oxide adduct also being present.

The suitability of the new bis(aminoethyl)ether derivatives as catalysts for foam formulations is shown in the remaining examples. The quantities listed in all examples are parts by weight. The foams are all prepared by conventional means using conventional polyols, isocyanates and additives. For examples in conventional foam preparation, see the disclosure for U.S. Pat. No. 4,101,470, incorporated by reference herein.

To prepare polyurethanes using the catalysts here, any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, bis(3-methyl-4-isocyanatophenyl)methane, and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given. Also for a flexible urethane foam, the polyol should preferably have an average functionality of from about 2 to about 4 and a molecular weight of from about 2,000 to about 6,000. For rigid foams, the functionality of the polyol component is preferably from about 4 to about 8.

When the polyol is a polyester, it is preferable to use as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc. may also be employed and are preferred. The alcohol component for the polyester should preferably contain a plurality of hydroxyl groups and is preferably an aliphatic alcohol, such as ethylene glycol, glycerol, pentaerythritol, trimethylolethane, trimethylolpropane, mannitol, sorbitol, or methyl glucoside. Mixtures of two or more of the above identified alcohols may be employed also if desired.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

For rigid polyether polyurethane foams, the polyol should have a functionality of from about 4 to about 8 and a molecular weight of from about 300 to about 1,200. Polyols for rigid polyether polyurethane foams may be made in various ways including the addition of an alkylene oxide as above to a polyhydric alcohol with a functionality of from 4 to 8. These polyols may also be, for example, Mannich condensation products of a phenol, an alkanolamine, and formaldehyde, which Mannich condensation product is then reacted with an alkylene oxide (see U.S. Pat. No. 3,297,597).

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 0.9 to about 1.5 mole equivalents of isocyanate groups per mole equivalent of hydroxyl groups. However, for certain shock absorbing foams we have found that by using the catalyst of our invention the mole equivalents of isocyanate to hydroxyl groups can be as low as 0.4.

When water is used, the amount of water, based on the hydroxyl compound, is suitably within the range of about 0.05 mole to about 10.0 moles per mole equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See for example U.S. Pat. No. 3,072,082.

The catalysts discovered here which are useful in the preparation of rigid or flexible polyester or polyether polyurethane foams, based on the combined weight of the hydroxyl-containing compound and polyisocyanate are employed in an amount of from about 0.03 to about 4.0 weight percent. More often, the amount of catalyst used is 0.06 to about 2.0 weight percent.

The catalysts of this invention may be used either alone or in a mixture with one or more other catalysts such as tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such tertiary amines include trialkylamines (e.g., trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'-tetramethyl-1,3-butanediamine.

Conventional formulation ingredients are also empolyed, such as, for example, foam stabilizers, also known as silicone oils or emulsifiers. The foam stabilizer may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

When it is desired to prepare rigid foams, the "one-shot" method or the so-called "quasi-prepolymer method" is employed, wherein the hydroxyl-containing component preferably contains from about 4 to 8 reactive hydroxyl groups, on the average, per molecule.

In accordance with the "quasi-prepolymer method", a portion of the hydroxyl-containing component is reacted in the absence of a catalyst with the polyisocyanate component in proportions so as to provide from about 20 percent to about 40 percent of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elastomers and coatings may be prepared also by known techniques in accordance with the present invention wherein a tertiary amine of this invention is used as a catalyst. See, for example, duPont Bulletin PB-2, by Remington and Lorenz, entitled "The Chemistry of Urethane Coatings".

The invention will be illustrated further with respect to the following specific examples, which are given by way of illustration and not as limitations on the scope of this invention.

EXAMPLE III

This example illustrates the use of these compounds as catalysts for flexible urethane foams.

|  | A | B | C | D | E |
|---|---|---|---|---|---|
| THANOL ® F-3016[1] | 100 | 100 | 100 | 100 | 100 |
| Silicone L-6202[2] | 1.1 | 1.1 | 1.1 | 1.1 | 1.1 |
| Water | 2.1 | 2.1 | 2.1 | 2.1 | 2.1 |
| 50% Stannous octoate in dioctylphthalate | 0.6 | 0.6 | 0.6 | 0.6 | 0.6 |
| Catalyst Example I | 0.5 | — | — | — | — |
| Catalyst Example II | — | 0.5 | — | — | — |
| Prior Art Catalyst I[3] | — | — | 0.5 | — | — |
| Prior Art Catalyst II[3] | — | — | — | 0.5 | — |
| Prior Art Catalyst III[3] | — | — | — | — | 0.5 |
| Methylene chloride | 8.0 | 8.0 | 8.0 | 8.0 | 8.0 |
| Toluene diisocyanate | 28.9 | 28.9 | 28.9 | 28.9 | 28.9 |
| Index | 1.05 | 1.05 | 1.05 | 1.05 | 1.05 |
| Cream time (sec) | 6 | 7 | 10 | 11 | 11 |
| Rise time (sec) | 110 | 134 | 145 | 136 | 154 |
| Density, pcf | 2.08 | — | — | 2.04 | 2.06 |

[1] An ethoxylated-propoxylated glycerine of hydroxyl number 56 sold by Texaco Chemical Co.
[2] A silicone surfactant sold by Union Carbide Corp.
[3] Prior art catalyst I is taken from U.S. Pat. No. 4,026,840 and has the following structure

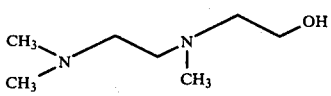

Prior art catalysts II and III are taken from U.S. Pat. No. 4,101,470 and have the following structures, respectively

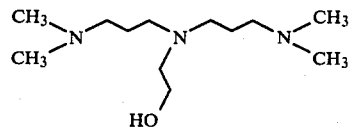

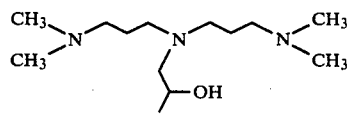

Comparing foams A, C and D from Example III, one can see that the catalyst of this invention is more efficient than the catalysts in C or D (rise time of 110 seconds vs. 145 and 136). The catalysts in C and D also have a lower amine equivalent weight than the catalyst from Example I (foam C equivalent weight is 73, foam D is 77, while catalyst of Example I has an equivalent weight of 95). Thus the catalysts from Example I give a faster reaction profile with less equivalents of amine being reacted. The same effect can also be observed in the propanol amine compounds (foams B and E).

EXAMPLE IV

This example illustrates the use of these amines as catalysts for rigid urethane foams.

| THANOL ® R-480[1] | 35 | 35 |
|---|---|---|
| Silicone L-5420[2] | 0.5 | 0.5 |
| Water | 0.3 | 0.3 |
| Trichlorofluoromethane | 13 | 13 |
| Catalyst Example I | 0.8 | |
| Catalyst Example II | | 0.8 |
| MONDUR ® MR[3] | 51.2 | 51.2 |
| Index | 1.04 | 1.04 |
| Cream time (seconds) | 10 | 12 |

| | | |
|---|---|---|
| Gel time (seconds) | 55 | 76 |
| Tack free time (seconds) | 70 | 104 |
| Rise time (seconds) | 90 | 154 |

[1] An amino-sucrose polyol, hydroxyl number 530, sold by Texaco Chemical Co.
[2] A silicone surfactant sold by Union Carbide Corp.
[3] A polymeric isocyanate sold by Mobay Chemical Co.

EXAMPLE V

This example illustrates the use of these compounds as catalysts for high resilient foams. Again, the unexpected high catalytic activity of these compounds can be observed (for the hydroxyl series from A, C, and D and for the hydroxypropyl series foams B and E). In each case when used at an equal weight basis the catalysts of this invention gave faster rise times than the other amines. Note also that the same weight of catalyst of this invention contains fewer equivalents of amine than the other catalysts.

| | A | B | C | D | E |
|---|---|---|---|---|---|
| THANOL® F-6503[1] | 60 | 60 | 60 | 60 | 60 |
| NIAX® 34-28[2] | 40 | 40 | 40 | 40 | 40 |
| Water | 3.5 | 3.5 | 3.5 | 3.5 | 3.5 |
| Silicone L-5309[3] | 2.0 | 2.0 | 2.0 | 2.0 | 2.0 |
| FDMREZ® UL-1[4] | 0.01 | 0.01 | 0.01 | 0.01 | 0.01 |
| Catalyst Example I | 0.5 | — | — | — | — |
| Catalyst Example II | — | 0.5 | — | — | — |
| Prior Art Catalyst II | — | — | 0.5 | — | — |
| Prior Art Catalyst I | — | — | — | 0.5 | — |
| Prior Art Catalyst III | — | — | — | — | 0.5 |
| Toluene diisocyanate/PAPI[4] | 42 | 42 | 42 | 42 | 42 |
| Cream time (seconds) | 7 | 8 | 8 | 8 | 8 |
| Rise time (seconds) | 125 | 120 | 140 | 140 | 145 |

[1] A propoxylated-ethoxylated glycerine, hydroxyl number 27, sold by Texaco Chemical Co.
[2] A polymer-polyol, hydroxyl number 28, sold by Union Carbide Corp.
[3] A silicone surfactant sold by Union Carbide Corp.
[4] Toluene diisocyanate 80% by weight, PAPI 20% by weight. PAPI is a polymeric isocyanate sold by Upjohn.

High resilient polyurethane foams require that an organic polyisocyanate be employed in the formulation. Frequently, a blend is used that consists of toluene diisocyanate and another polyisocyanate.

A blend of polyols must be used to make foams of high resiliency. One of the blend components is a polyether polyol formed by the addition of a polyhydric alcohol having a functionality of from 2 to about 4 with an alkylene oxide of 2 to 4 carbon atoms. The polyether polyol should have a functionality of from about 2 to about 4 and a hydroxyl number ranging from about 20 to about 60. The second blend polyol is preferably a grafted polymer polyol containing from about 4 to about 25 weight percent acrylonitrile and from zero to about 10 weight percent styrene. The molecular weight of the base polyol is preferably from about 2,800 to 5,000. The hydroxyl number of the resulting graft polyol preferably ranges from about 25 to about 45. These latter graft polyols are described in detail in U.S. Pat. Nos. 3,304,273 and 3,383,351.

The mole equivalent ratio of isocyanate groups to hydroxyl groups should be about 0.9 to 1.2 to obtain the high resilient foams of this invention.

EXAMPLE VI

The compound of Example I may be used to prepare a packaging foam as shown below:

| | |
|---|---|
| THANOL® SF-2750[1] | 100 |
| Water | 20 |
| Trichlorofluoromethane | 35 |
| Silicone L-520[2] | 1.5 |
| Catalyst Example I | 4.0 |
| MONDUR MR | 140.5 |
| Cream time (seconds) | 8 |
| Rise time (seconds) | 43 |
| Gel time (seconds) | 45 |

[1] Polyol sold by Texaco Chemical Co., hydroxyl number 220.
[2] A silicone surfactant sold by Union Carbide Corp.

We claim:

1. A method for producing a polyurethane which comprises reacting an organic polyisocyanate with an organic polyester polyol or polyether polyol in the presence of a catalytic amount of an amine of the formula

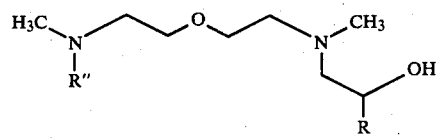

where R is hydrogen or lower alkyl and R″ is methyl or

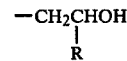

2. The method of claim 1 where the polyurethane is a cellular polyurethane obtained by reacting said polyols with said polyisocyanate in the presence of a blowing agent.

3. The method of claim 1 wherein a flexible urethane foam is produced.

4. The method of claim 1 wherein a rigid urethane foam is produced.

5. The method of claim 1 wherein a high resilient foam is produced.

6. The method of claim 1 wherein a packaging foam is produced.

7. The method of claim 1 wherein a flexible polyether polyurethane foam is provided which comprises reacting in the presence of a blowing agent said organic polyisocyanate with a polyether polyol formed by the addition of a polyhydric alcohol having a functionality of from 2 to about 4 with an alkylene oxide of 2 to 4 carbon atoms in the presence of said catalyst, said organic polyisocyanate being employed in an amount sufficient to provide 0.4 to 1.5 mole equivalents of isocyanate groups per mole equivalent of hydroxyl groups, said polyether polyol having a molecular weight within the range of about 2,000–7,000.

8. The method of claim 1 wherein a flexible polyester polyurethane foam is prepared which comprises reacting in the presence of a blowing agent, toluene diisocyanate with a hydroxyl terminated condensation product of a polycarboxylic acid and a polyhydric alcohol in the presence of said catalyst, said toluene diisocyanate being employed in an amount sufficient to provide 0.9 to 1.5 mole equivalents of isocyanate groups per mole equivalent of hydroxyl groups, said condensation product having a functionality of from about 2 to about 4, and a molecular weight from about 2,000 to about 6,000 and a hydroxyl number ranging from about 25 to about 60.

9. The method of claim 1 wherein a highly resilient polyether polyurethane foam is prepared which comprises reacting in the presence of a blowing agent said organic polyisocyanate with a polyol blend comprising
(a) A polyether polyol formed by the addition of a polyhydric alcohol having a functionality of from 2 to about 4 with an alkylene oxide of 2 to 4 carbon atoms, the polyether polyol having a functionality of from about 2 to about 4 and a hydroxyl number ranging from about 20 to about 60, and
(b) A grafted polymer polyol containing from about 4 to about 25 weight percent acrylonitrile and from zero to about 10 weight percent styrene, the molecular weight of the base polyol ranging from about 2,800 to about 5,000, and the hydroxyl number of the grafted polyol ranging from about 25 to about 45, in the presence of said catalyst, said organic polyisocyanate being employed in an amount sufficient to provide 0.9 to 1.2 mole equivalent of isocyanate groups per mole equivalent of hydroxyl groups.

10. The method of claim 1 wherein said catalyst is 2-[N-(dimethylaminoethoxyethyl)-N-methylamino]ethanol.

11. The method of claim 1 wherein said catalyst is 2-[N-dimethylaminoethoxyethyl)-N-methylamino]-1-methylethanol.

* * * * *